(12) United States Patent
Bowen (10) Patent No.: US 8,624,906 B2
(45) Date of Patent: Jan. 7, 2014

(54) METHOD AND SYSTEM FOR NON STALLING PIPELINE INSTRUCTION FETCHING FROM MEMORY

(75) Inventor: Andrew D. Bowen, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 725 days.

(21) Appl. No.: 10/955,217

(22) Filed: Sep. 29, 2004

(65) Prior Publication Data

US 2006/0066623 A1    Mar. 30, 2006

(51) Int. Cl.
*G06T 1/20* (2006.01)
*G06F 9/30* (2006.01)

(52) U.S. Cl.
USPC ............ 345/506; 712/205; 712/206; 712/207

(58) Field of Classification Search
USPC .......................... 345/506; 712/207, 205, 206
See application file for complete search history.

(56) References Cited

U.S. PATENT DOCUMENTS

| | | | |
|---|---|---|---|
| 3,091,657 A | 5/1963 | Stuessel | |
| 3,614,740 A | 10/1971 | Delagi et al. | |
| 3,987,291 A | 10/1976 | Gooding et al. | |
| 4,101,960 A | 7/1978 | Stokes et al. | |
| 4,541,046 A | 9/1985 | Nagashima et al. | |
| 4,566,005 A | 1/1986 | Apperley et al. | |
| 4,748,585 A | 5/1988 | Chiarulli et al. | |
| 4,897,717 A | 1/1990 | Hamilton et al. | |
| 4,958,303 A | 9/1990 | Assarpour et al. | |
| 4,965,716 A | 10/1990 | Sweeney | |
| 4,965,751 A | 10/1990 | Thayer et al. | |
| 4,985,848 A | 1/1991 | Pfeiffer et al. | |
| 5,040,109 A | 8/1991 | Bowhill et al. | |
| 5,047,975 A | 9/1991 | Patti et al. | |
| 5,175,828 A | 12/1992 | Hall et al. | |
| 5,179,530 A | 1/1993 | Genusov et al. | |
| 5,197,130 A | 3/1993 | Chen et al. | |
| 5,210,834 A | 5/1993 | Zurawski et al. | |
| 5,263,136 A | 11/1993 | DeAguiar et al. | |
| 5,327,369 A | 7/1994 | Ashkenazi | |
| 5,357,623 A | 10/1994 | Megory-Cohen | |
| 5,375,223 A | 12/1994 | Meyers et al. | |

(Continued)

FOREIGN PATENT DOCUMENTS

DE    29606102    6/1996
JP    07-101885    4/1995

(Continued)

OTHER PUBLICATIONS

Hutchins E., SC10: A Video Processor and Pixel-Shading GPU for Handheld Devices; presented at the Hot Chips conferences on Aug. 23, 2004.

(Continued)

*Primary Examiner* — Kee M Tung
*Assistant Examiner* — Frank Chen (57) ABSTRACT

A method and system for graphics instruction fetching. The method includes executing a plurality of threads in a multi-threaded execution environment. A respective plurality of instructions are fetched to support the execution of the threads. During runtime, at least one instruction is prefetched for one of the threads to a prefetch buffer. The at least one instruction is accessed from the prefetch buffer if required by the one thread and discarded if not required by the one thread.

14 Claims, 5 Drawing Sheets

(56) References Cited

U.S. PATENT DOCUMENTS

| | | | | |
|---|---|---|---|---|
| 5,388,206 | A | 2/1995 | Poulton et al. | |
| 5,388,245 | A | 2/1995 | Wong | |
| 5,418,973 | A | 5/1995 | Ellis et al. | |
| 5,430,841 | A | 7/1995 | Tannenbaum et al. | |
| 5,430,884 | A | 7/1995 | Beard et al. | |
| 5,432,905 | A | 7/1995 | Hsieh et al. | |
| 5,517,666 | A | 5/1996 | Ohtani et al. | |
| 5,522,080 | A | 5/1996 | Harney | |
| 5,560,030 | A | 9/1996 | Guttag et al. | |
| 5,561,808 | A | 10/1996 | Kuma et al. | |
| 5,574,944 | A | 11/1996 | Stager | |
| 5,627,988 | A | 5/1997 | Oldfield | |
| 5,644,753 | A | 7/1997 | Ebrahim et al. | |
| 5,649,173 | A | 7/1997 | Lentz | |
| 5,666,169 | A | 9/1997 | Ohki et al. | |
| 5,682,552 | A | 10/1997 | Kuboki et al. | |
| 5,682,554 | A | 10/1997 | Harrell | |
| 5,706,478 | A | 1/1998 | Dye | |
| 5,754,191 | A | 5/1998 | Mills et al. | |
| 5,761,476 | A | 6/1998 | Martell | |
| 5,764,243 | A | 6/1998 | Baldwin | |
| 5,784,590 | A | 7/1998 | Cohen et al. | |
| 5,784,640 | A | 7/1998 | Asghar et al. | |
| 5,796,974 | A | 8/1998 | Goddard et al. | |
| 5,802,574 | A | 9/1998 | Atallah et al. | |
| 5,809,524 | A | 9/1998 | Singh et al. | |
| 5,812,147 | A | 9/1998 | Van Hook et al. | |
| 5,835,788 | A | 11/1998 | Blumer et al. | |
| 5,848,254 | A | 12/1998 | Hagersten | |
| 5,920,352 | A | 7/1999 | Inoue | |
| 5,925,124 | A | 7/1999 | Hilgendorf et al. | |
| 5,940,090 | A | 8/1999 | Wilde | |
| 5,940,858 | A | 8/1999 | Green | |
| 5,949,410 | A | 9/1999 | Fung | |
| 5,950,012 | A | 9/1999 | Shiell et al. | |
| 5,978,838 | A | 11/1999 | Mohamed et al. | |
| 5,999,199 | A | 12/1999 | Larson | |
| 6,009,454 | A | 12/1999 | Dummermuth | |
| 6,016,474 | A | 1/2000 | Kim et al. | |
| 6,041,399 | A | 3/2000 | Terada et al. | |
| 6,049,672 | A | 4/2000 | Shiell et al. | |
| 6,073,158 | A | 6/2000 | Nally et al. | |
| 6,092,094 | A | 7/2000 | Ireton | |
| 6,108,766 | A | 8/2000 | Hahn et al. | |
| 6,112,019 | A | 8/2000 | Chamdani et al. | |
| 6,131,152 | A | 10/2000 | Ang et al. | |
| 6,141,740 | A | 10/2000 | Mahalingaiah et al. | |
| 6,144,392 | A | 11/2000 | Rogers | |
| 6,150,610 | A | 11/2000 | Sutton | |
| 6,189,068 | B1 | 2/2001 | Witt et al. | |
| 6,192,073 | B1 | 2/2001 | Reader et al. | |
| 6,192,458 | B1 | 2/2001 | Arimilli et al. | |
| 6,208,361 | B1 | 3/2001 | Gossett | |
| 6,209,078 | B1 | 3/2001 | Chiang et al. | |
| 6,222,552 | B1 | 4/2001 | Haas et al. | |
| 6,230,254 | B1 | 5/2001 | Senter et al. | |
| 6,239,810 | B1 | 5/2001 | Van Hook et al. | |
| 6,247,094 | B1 | 6/2001 | Kumar et al. | |
| 6,252,610 | B1 | 6/2001 | Hussain | |
| 6,292,886 | B1 | 9/2001 | Makineni et al. | |
| 6,301,600 | B1 | 10/2001 | Petro et al. | |
| 6,314,493 | B1 | 11/2001 | Luick | |
| 6,317,819 | B1 | 11/2001 | Morton | |
| 6,351,808 | B1 | 2/2002 | Joy et al. | |
| 6,370,617 | B1 | 4/2002 | Lu et al. | |
| 6,437,789 | B1 | 8/2002 | Tidwell et al. | |
| 6,438,664 | B1 | 8/2002 | McGrath et al. | |
| 6,480,927 | B1 | 11/2002 | Bauman | |
| 6,490,654 | B2 | 12/2002 | Wickeraad et al. | |
| 6,496,902 | B1 | 12/2002 | Faanes et al. | |
| 6,499,090 | B1* | 12/2002 | Hill et al. | 711/158 |
| 6,525,737 | B1 | 2/2003 | Duluk, Jr. et al. | |
| 6,529,201 | B1 | 3/2003 | Ault et al. | |
| 6,597,357 | B1* | 7/2003 | Thomas | 345/426 |
| 6,603,481 | B1 | 8/2003 | Kawai et al. | |
| 6,624,818 | B1 | 9/2003 | Mantor et al. | |
| 6,629,188 | B1 | 9/2003 | Minkin et al. | |
| 6,631,423 | B1 | 10/2003 | Brown et al. | |
| 6,631,463 | B1 | 10/2003 | Floyd et al. | |
| 6,657,635 | B1 | 12/2003 | Hutchins et al. | |
| 6,658,447 | B2* | 12/2003 | Cota-Robles | 718/103 |
| 6,674,841 | B1 | 1/2004 | Johns et al. | |
| 6,700,588 | B1 | 3/2004 | MacInnis et al. | |
| 6,715,035 | B1 | 3/2004 | Colglazier et al. | |
| 6,732,242 | B2* | 5/2004 | Hill et al. | 711/158 |
| 6,809,732 | B2 | 10/2004 | Zatz et al. | |
| 6,812,929 | B2 | 11/2004 | Lavelle et al. | |
| 6,825,843 | B2 | 11/2004 | Allen et al. | |
| 6,825,848 | B1 | 11/2004 | Fu et al. | |
| 6,839,062 | B2 | 1/2005 | Aronson et al. | |
| 6,862,027 | B2* | 3/2005 | Andrews et al. | 345/505 |
| 6,891,543 | B2 | 5/2005 | Wyatt | |
| 6,915,385 | B1 | 7/2005 | Leasure et al. | |
| 6,944,744 | B2 | 9/2005 | Ahmed et al. | |
| 6,952,214 | B2 | 10/2005 | Naegle et al. | |
| 6,965,982 | B2* | 11/2005 | Nemawarkar | 712/207 |
| 6,975,324 | B1 | 12/2005 | Valmiki et al. | |
| 6,976,126 | B2 | 12/2005 | Clegg et al. | |
| 6,978,149 | B1 | 12/2005 | Morelli et al. | |
| 6,978,457 | B1 | 12/2005 | Johl et al. | |
| 6,981,106 | B1 | 12/2005 | Bauman et al. | |
| 6,985,151 | B1 | 1/2006 | Bastos et al. | |
| 7,015,909 | B1 | 3/2006 | Morgan, III et al. | |
| 7,031,330 | B1 | 4/2006 | Bianchini, Jr. | |
| 7,032,097 | B2* | 4/2006 | Alexander et al. | 711/216 |
| 7,035,979 | B2 | 4/2006 | Azevedo et al. | |
| 7,148,888 | B2* | 12/2006 | Huang | 345/419 |
| 7,151,544 | B2 | 12/2006 | Emberling | |
| 7,154,500 | B2* | 12/2006 | Heng et al. | 345/424 |
| 7,159,212 | B2 | 1/2007 | Schenk et al. | |
| 7,185,178 | B1* | 2/2007 | Barreh et al. | 712/206 |
| 7,202,872 | B2* | 4/2007 | Paltashev et al. | 345/555 |
| 7,260,677 | B1 | 8/2007 | Vartti et al. | |
| 7,305,540 | B1 | 12/2007 | Trivedi et al. | |
| 7,321,787 | B2 | 1/2008 | Kim | |
| 7,334,110 | B1 | 2/2008 | Faanes et al. | |
| 7,369,815 | B2 | 5/2008 | Kang et al. | |
| 7,373,478 | B2 | 5/2008 | Yamazaki | |
| 7,406,698 | B2 | 7/2008 | Richardson | |
| 7,412,570 | B2 | 8/2008 | Moll et al. | |
| 7,486,290 | B1 | 2/2009 | Kilgariff et al. | |
| 7,487,305 | B2* | 2/2009 | Hill et al. | 711/158 |
| 7,493,452 | B2 | 2/2009 | Eichenberger et al. | |
| 7,545,381 | B2 | 6/2009 | Huang et al. | |
| 7,564,460 | B2 | 7/2009 | Boland et al. | |
| 7,750,913 | B1 | 7/2010 | Parenteau et al. | |
| 7,777,748 | B2 | 8/2010 | Bakalash et al. | |
| 7,852,341 | B1 | 12/2010 | Rouet et al. | |
| 7,869,835 | B1 | 1/2011 | Zu | |
| 8,020,169 | B2 | 9/2011 | Yamasaki | |
| 8,427,490 | B1 | 4/2013 | Luu et al. | |
| 2001/0026647 | A1 | 10/2001 | Morita | |
| 2002/0116595 | A1 | 8/2002 | Morton | |
| 2002/0130874 | A1 | 9/2002 | Baldwin | |
| 2002/0144061 | A1 | 10/2002 | Faanes et al. | |
| 2002/0194430 | A1 | 12/2002 | Cho | |
| 2003/0001847 | A1 | 1/2003 | Doyle et al. | |
| 2003/0003943 | A1 | 1/2003 | Bajikar | |
| 2003/0014457 | A1 | 1/2003 | Desai et al. | |
| 2003/0016217 | A1 | 1/2003 | Vlachos et al. | |
| 2003/0016844 | A1 | 1/2003 | Numaoka | |
| 2003/0031258 | A1 | 2/2003 | Wang et al. | |
| 2003/0067473 | A1 | 4/2003 | Taylor et al. | |
| 2003/0172326 | A1 | 9/2003 | Coffin, III et al. | |
| 2003/0188118 | A1 | 10/2003 | Jackson | |
| 2003/0204673 | A1 | 10/2003 | Venkumahanti et al. | |
| 2003/0204680 | A1 | 10/2003 | Hardage, Jr. | |
| 2003/0227461 | A1 | 12/2003 | Hux et al. | |
| 2004/0012597 | A1 | 1/2004 | Zatz et al. | |
| 2004/0073771 | A1 | 4/2004 | Chen et al. | |
| 2004/0073773 | A1 | 4/2004 | Demjanenko | |
| 2004/0103253 | A1 | 5/2004 | Kamei et al. | |
| 2004/0193837 | A1 | 9/2004 | Devaney et al. | |
| 2004/0205326 | A1 | 10/2004 | Sindagi et al. | |

(56) References Cited

U.S. PATENT DOCUMENTS

| | | | |
|---|---|---|---|
| 2004/0212730 | A1 | 10/2004 | MacInnis et al. |
| 2004/0215887 | A1 | 10/2004 | Starke |
| 2004/0221117 | A1 | 11/2004 | Shelor |
| 2004/0263519 | A1* | 12/2004 | Andrews et al. ............... 345/502 |
| 2005/0012759 | A1 | 1/2005 | Valmiki et al. |
| 2005/0024369 | A1 | 2/2005 | Xie |
| 2005/0071722 | A1 | 3/2005 | Biles |
| 2005/0088448 | A1 | 4/2005 | Hussain et al. |
| 2005/0239518 | A1 | 10/2005 | D'Agostino et al. |
| 2005/0262332 | A1 | 11/2005 | Rappoport et al. |
| 2005/0280652 | A1 | 12/2005 | Hutchins et al. |
| 2006/0020843 | A1 | 1/2006 | Frodsham et al. |
| 2006/0064517 | A1 | 3/2006 | Oliver |
| 2006/0064547 | A1 | 3/2006 | Kottapalli et al. |
| 2006/0103659 | A1 | 5/2006 | Karandikar et al. |
| 2006/0152519 | A1 | 7/2006 | Hutchins et al. |
| 2006/0152520 | A1 | 7/2006 | Gadre et al. |
| 2006/0176308 | A1 | 8/2006 | Karandikar et al. |
| 2006/0176309 | A1 | 8/2006 | Gadre et al. |
| 2007/0076010 | A1 | 4/2007 | Swamy et al. |
| 2007/0130444 | A1 | 6/2007 | Mitu et al. |
| 2007/0285427 | A1 | 12/2007 | Morein et al. |
| 2008/0016327 | A1 | 1/2008 | Menon et al. |
| 2008/0278509 | A1 | 11/2008 | Washizu et al. |
| 2009/0235051 | A1 | 9/2009 | Codrescu et al. |
| 2012/0023149 | A1 | 1/2012 | Kinsman et al. |

FOREIGN PATENT DOCUMENTS

| | | |
|---|---|---|
| JP | H08-077347 | 3/1996 |
| JP | H08-153032 | 6/1996 |
| JP | 08-297605 | 12/1996 |
| JP | 09-287217 | 11/1997 |
| JP | H09-325759 | 12/1997 |
| JP | 10-222476 | 8/1998 |
| JP | 11-190447 | 7/1999 |
| JP | 2000-148695 | 5/2000 |
| JP | 2001-022638 | 1/2001 |
| JP | 2003-178294 | 6/2003 |
| JP | 2004-252990 | 9/2004 |
| KR | 100262453 | 5/2000 |
| KR | 1998-018215 | 8/2000 |
| TW | 413766 | 12/2000 |
| TW | 436710 | 5/2001 |
| TW | 442734 | 6/2001 |

OTHER PUBLICATIONS

Wilson D., NVIDIA's Tiny 90nm G71 and G73: GeForce 7900 and 7600 Debut; at http://www.anandtech.com/show/1967/2; dated Sep. 3, 2006, retrieved Jun. 16, 2011.

Woods J., Nvidia GeForce FX Preview, at http://www.tweak3d.net/reviews/nvidia/nv30preview/1.shtml; dated Nov. 18, 2002; retrieved Jun. 16, 2011.

NVIDIA Corporation, Technical Brief: Transform and Lighting; dated 1999; month unknown.

Merriam-Webster Dictionary Online; Definition for "program"; retrieved Dec. 14, 2010.

Gadre, S., Patent Application Entitled "Video Processor Having Scalar and Vector Components With Command FIFO for Passing Function Calls From Scalar to Vector", U.S. Appl. No. 11/267,700, filed Nov. 4, 2005.

Gadre, S., Patent Application Entitled "Stream Processing in a Video Processor", U.S. Appl. No. 11/267,599, filed Nov. 4, 2005.

Karandikar et al., Patent Application Entitled: "Multidemnsional Datapath Processing in a Video Processor", U.S. Appl. No. 11/267,638, filed Nov. 4, 2005.

Karandikar et al., Patent Application Entitled: "A Latency Tolerant System for Executing Video Processing Operations", U.S. Appl. No. 11/267,875, filed Nov. 4, 2005.

Lew, et al., Patent Application Entitled "A Programmable Dma Engine for Implementing Memory Transfers for a Video Processor", U.S. Appl. No. 11/267,777, filed Nov. 4, 2005.

Karandikar et al., Patent Application Entitled: "A Pipelined L2 Cache for Memory Transfers for a Video Processor", U.S. Appl. No. 11/267,606, filed Nov. 4, 2005.

Karandikar, et al., Patent Application Entitled: "Command Acceleration in a Video Processor", U.S. Appl. No. 11/267,640, filed Nov. 4, 2005.

Karandikar, et al., Patent Application Entitled "A Configurable SIMD Engine in a Video Processor", U.S. Appl. No. 11/267,393, filed Nov. 4, 2005.

Karandikar, et al., Patent Application Entitled "Context Switching on a Video Processor Having a Scalar Execution Unit and a Vector Execution Unit", U.S. Appl. No. 11/267,778, filed Nov. 4, 2005.

Lew, et al., Patent Application Entitled "Multi Context Execution on a Video Processor", U.S. Appl. No. 11/267,780, filed Nov. 4, 2005.

Su, Z, et al., Patent Application Entitled: "State Machine Control for a Pipelined L2 Cache to Implement Memory Transfers for a Video Processor", U.S. Appl. No. 11/267,119, filed Nov. 4, 2005.

Kozyrakis, "A Media enhanced vector architecture for embedded memory systems," Jul. 1999, http://digitalassets.lib.berkeley.edu/techreports/ucb/text/CSD-99/1059.pdf.

HPL-PD A Parameterized Research Approach—May 31, 2004 http://web.archive.org/web/*/www.trimaran.org/docs/5_hpl-pd.pdf.

Heirich; Optimal Automatic Mulit-pass Shader Partitioning by Dynamic Programming; Eurographics—Graphics Hardware (2005); Jul. 2005.

Intel, Intel Architecture Software Deveopler's Manual, vol. 1: Basic Architecture 1997 p. 8-1.

Intel, Intel Architecture Software Deveopler's Manual, vol. 1: Basic Architecture 1999 p. 8-1, 9-1.

Intel, Intel Pentium III Xeon Processor at 500 and 550Mhz, Feb. 1999.

Free On-Line Dictionary of Computing (FOLDOC), defintion of "video", from foldoc.org/index.cgi?query=video&action=Search, May 23, 2008.

PCreview, article entitled "What is a Motherboard", from www.pereview.co.uklarticles/Hardware/What_is_a_Motherboard., Nov. 22, 2005.

FOLDOC, definition of "separate compilation", from foldoc.org/index.cgi?query=separate+compilation&action=Search, Feb. 19, 2005.

Wikipedia, defintion of "vector processor", http://en.wikipedia.org/, May 14, 2007.

FOLDOC (Free On-Line Dictionary of Computing), defintion of X86, Feb. 27, 2004.

FOLDOC, definition of "superscalar," http://foldoc.org/, Jun. 22, 2009.

Wikipedia, definition of "scalar processor," Apr. 4, 2009.

Wikipedia, entry page defining term "SIMD", last modified Mar. 17, 2007.

FOLDOC, Free Online Dictionary of Computing, defintion of SIMD, foldoc.org/index.cgi?query=simd&action=Search, Nov. 4, 1994.

Definition of "queue" from Free on-Line Dictionary of Computing (FOLDOC), http://folddoc.org/index.cgi?query=queue&action=Search, May 15, 2007.

Quinnell, Richard A. "New DSP Architectures Go "Post-Harvard" for Higher Performance and Flexibility" Techonline; posted May 1, 2002.

Wikipedia, definition of Multiplication, accessed from en.wikipedia.org/w/index.php?title=Multiplication&oldid=1890974, published Oct. 13, 2003.

Hamacher, V. Carl et al., Computer Organization, Second Edition, McGraw Hill, 1984, pp. 1-9.

Rosenberg, Jerry M., Dictionary of Computers, Information Processing & Telecommunications, 2nd Edition, John Wiley & Sons, 1987, pp. 305.

Wikipeida, definition of "subroutine", published Nov. 29, 2003, four pages.

SearchStorage.com Definitions, "Pipeline Burst Cache," Jul. 31, 2001, url: http://searchstorage.techtarget.com/sDefinition/0,,sid5_gci214414,00.html.

Parhami, Behrooz, Computer Arithmetic: Algorithms and Hardware Designs, Oxford University Press, Jun. 2000, pp. 413-418.

(56) References Cited

OTHER PUBLICATIONS

"Vertex Fog"; http://msdn.microsoft.com/library/en-us/directx9_c/Vertex_fog.asp?frame=true Mar. 27, 2006.

"Anti-aliasing"; http://en.wikipedia.org/wiki/Anti-aliasing; Mar. 27, 2006.

"Alpha Testing State"; http://msdn.microsoft.com/library/en-us/directx9_c/directx/graphics/programmingguide/GettingStarted/Direct3Kdevices/States/renderstates/alphatestingstate.asp Mar. 25, 2005.

Defintion of "Slot," http://www.thefreedictionary.com/slot, Oct. 2, 2012.

Korean Intellectual Property Office; English Abstract for Publication No. 100262453, corresponding to application 1019970034995, 2001.

Rosenberg, Jerry M., Dictionary of Computers, Information Processing & Telecommunications, 2nd Edition, John Wiley & Sons, 1987, pp. 102 and 338.

Brown, Brian; "Data Structure and Number Systems"; 2000; http://www.ibilce.unesp.br/courseware/datas/data3.htm.

Definition of "block" from FOLDOC, http://foldoc.org/index.cgi?block, Sep. 23, 2004.

Definition of "first-in first-out" from FOLDOC, http://foldoc.org/index.cgi?query=fifo&action=Search, Dec. 6, 1999.

Definition of "queue" from Free on-Line Dictionary of Computing (FOLDOC), http://foldoc.org/index.cgi?query=queue&action=Search, May 15, 2007.

Duca et al., A Relational Debugging Engine for Graphics Pipeline, International Conference on Computer Graphics and Interactive Techniques, ACM SIGGRAPH 2005, pp. 453-463, ISSN:0730-0301.

Espasa R et al: "Decoupled vector architectures", High-Performance Computer Architecture, 1996. Proceedings., Second International Symposium on San Jose, CA, USA Feb. 3-7, 1996, Los Alamitos, CA, USA, IEEE Comput. Soc, US, Feb. 3, 1996, pp. 281-290, XP010162067. DOI: 10.11 09/HPCA, 1996.501193 ISBN: 978-0-8186-7237-8.

Fisher, Joseph A., Very Long Instruction Word Architecture and the ELI-512, ACM, 1993, pp. 140-150.

FOLDOC (Free On-Line Dictionary of Computing), definition of X86, Feb. 27, 2004.

FOLDOC, definition of "frame buffer", from foldoc.org/index.cgi?query=frame+buffer&action=Search, Oct. 3, 1997.

FOLDOC, definition of "motherboard", from foldoc.org/index.cgi?query=motherboard&action=Search, Aug. 10, 2000.

FOLDOC, definition of "separate compilation", from foldoc.orglindex.cgi?query=separate+compilation&action=Search, Feb. 19, 2005.

FOLDOC, definition of "superscalar", http://foldoc.org/, Jun. 22, 2009.

FOLDOC, definition of "vector processor", http://foldoc.org/, Sep. 11, 2003.

FOLDOC, definition of Pentium, Sep. 30, 2003.

FOLDOC, Free Online Dictionary of Computing, definition of SIMD, foldoc.org/index.cgi?query=simd&action=Search, Nov. 4, 1994.

Free On-Line Dictionary of Computing (FOLDOC), definition of "video", from foldoc.org/index.cgi?query=video&action=Search, May 23, 2008.

Gadre, S., Patent Application Entitled "Separately Schedulable Condition Codes for a Video Processor", U.S. Appl. No. 11/267,793, filed Nov. 4, 2005.

gDEBugger, graphicRemedy, http://www.gremedy.com, Aug. 8, 2006.

Graf, Rudolf F., Modern Dictionary of Electronics, Howard W. Sams & Company, 1984, pp. 566.

Graf, Rudolf F., Modern Dictionary of Electronics, Howard W. Sams & Company, 1988, pp. 273.

Graham, Susan L. et al., Getting Up to Speed: The future of Supercomputing, the National Academies Press, 2005, glossary.

Graston et al. (Software Pipelining Irregular Loops on the TMS320C6000 VLIW DSP Architecture); Proceedings of the ACM SIGPLAN workshop on Languages, compilers and tools for embedded systems; pp. 138-144; Year of Publication: 2001.

Hamacher, V. Carl et l., Computer Organization, Second Edition, McGraw Hill, 1984, pp. 1-9.

Heinich; Optimal Automatic Multi-pass Shader Partitioning by Dynamic Programming; Eurographics-Graphics Hardware (2005); Jul. 2005.

HPL-PD A Parameterized Research Approach—May 31, 2004 http://web.archive.org/web/*/www.trimaran.org/docs/5_hpl-pd.pdf.

Hutchins E., SC10: A Video Processor and Pixel-Shading GPU for Handheld Devices; presented at the Hot Chips conferences on Aug. 23rd, 2004.

IBM TDB, Device Queue Management, vol. 31 Iss. 10, pp. 45-50, Mar. 1, 1989.

Intel, Intel Architecture Software Developer's Manual, vol. 1: Basic Architecture 1997 p. 8-1.

Intel, Intel Architecture Software Developer's Manual, vol. 1: Basic Architecture 1999 p. 8-1, 9-1.

Intel, Intel MMX Technology at a Glance, Jun. 1997.

Intel, Intel Pentium III Xeon Processor at 500 and 550 Mhz, Feb. 1999.

Intel, Pentium Processor Family Developer's Manual, 1997, pp. 2-13.

Intel, Pentium processor with MMX Technology at 233Mhz Performance Brief, Jan. 1998, pp. 3 and 8.

\* cited by examiner

FIGURE 5

METHOD AND SYSTEM FOR NON STALLING PIPELINE INSTRUCTION FETCHING FROM MEMORY

FIELD OF THE INVENTION

The present invention is generally related to graphics computer systems. More particularly, the present invention is directed towards fetching instructions from the memory of a graphics computer system.

BACKGROUND OF THE INVENTION

Recent advances in computer performance have enabled graphic systems to provide more realistic graphical images using personal computers and home video game computers. In such graphic systems, a number of procedures are executed to "render" or draw graphic primitives to the screen of the system. A "graphic primitive" is a basic component of a graphic picture, such as a vertex, polygon, or the like. All graphic pictures are formed with combinations of these graphic primitives. Many procedures may be utilized to perform graphic primitive rendering.

Specialized graphics processing units (e.g., GPUs, etc.) have been developed to optimize the computations required in executing the graphics rendering procedures. The GPUs are configured for high-speed operation and typically incorporate one or more rendering pipelines. The hardware of a typical GPU's rendering pipeline(s) is optimized to support an essentially linear topology, where instructions are fed into the front end of the pipeline and the computed results emerge at the bottom of the pipeline. For example, typical prior art linear pipelines tightly couple instruction fetch operations with the resulting calculation operations. Even with parallel instruction fetches, the calculations are tightly coupled with their corresponding instruction fetches.

To maximize throughput and overall rendering speed, the pipeline architecture is such that the execution hardware of the pipeline is non-stallable. This means intermediate results within the pipeline advance step-by-step through the pipeline with successive clock cycles. The pipeline cannot be stalled by means of wait states or the like. Consequently, the front end of the pipeline, or the instruction fetch portion, is similarly a non-stallable instruction fetch pipeline, where once an address is issued, the instruction fetch will occur and the resulting instruction must either be used or thrown away.

Furthermore, in a multithreaded execution environment, the issue stage of the pipeline (e.g., the pipeline portion typically just below the fetch stage) has a finite amount of instruction storage per processor thread. This storage is used to keep instructions available for all threads executing at all times.

A problem exists in the fact that for a non-stallable pipeline, the finite amount of instruction storage per thread is often insufficient to avoid starving subsequent stages of instructions unless usable instructions are in flight from the instruction cache to the storage of the issue stage. For example, modern GPUs support branches and the like in shader programs executing on the GPU. Branching has the effect of flushing all instructions in the pipeline. Similarly, data dependencies and other types of data hazards often result in stalling the instruction fetch stage, having the effect of backing up the pipeline.

One prior art solution was to keep track of how many instructions were fetched per thread, and then fetch a new instruction when an instruction was issued. This solution can be inefficient due to the timing problems caused by the decision of whether or not to issue (and which thread to issue) can happen late in a cycle, and an instruction fetch state machine typically cannot recover in time to select some other instruction. This solution also had problems when a branch was taken. For example, there was no mechanism to adjust the priority of the flushed thread. Thus, what is required is an efficient mechanism for fetching instructions for non-stalling pipelines.

SUMMARY OF THE INVENTION

Embodiments of the present invention provide a method and system for non-stalling pipeline instruction fetching from memory. Embodiments of the present invention provide efficient instruction fetching support for a multithreaded execution environment as implemented on one or more non-stalling execution pipelines.

In one embodiment, the present invention is implemented as a graphics instruction fetching method implemented for a processor (e.g., GPU) of a computer system. The GPU supports the execution of a plurality of threads in a multithreaded execution environment. A respective plurality of instructions are fetched (e.g., by an instruction fetch stage) to support the execution of the threads. During runtime, one or more instructions are prefetched for at least one of the threads to a prefetch buffer. The instruction(s) is accessed from the prefetch buffer if required by the thread and discarded if not required by the thread. In this manner, instructions can be speculatively prefetched and stored within the prefetch buffer, where they are subsequently accessed if required.

In one embodiment, respective instructions are prefetched for each thread using a respective program counter. Each of the respective program counters are configured to access a plurality of prefetched instructions for the respective threads.

In one embodiment, a respective priority is assigned to each of the threads and new instructions are prefetched for each of the threads in accordance with the respective priority. Additionally, in one embodiment, a respective age is assigned to each of the threads and new instructions are prefetched for each of the threads in accordance with the respective age.

BRIEF DESCRIPTION OF THE DRAWINGS

The present invention is illustrated by way of example, and not by way of limitation, in the Figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
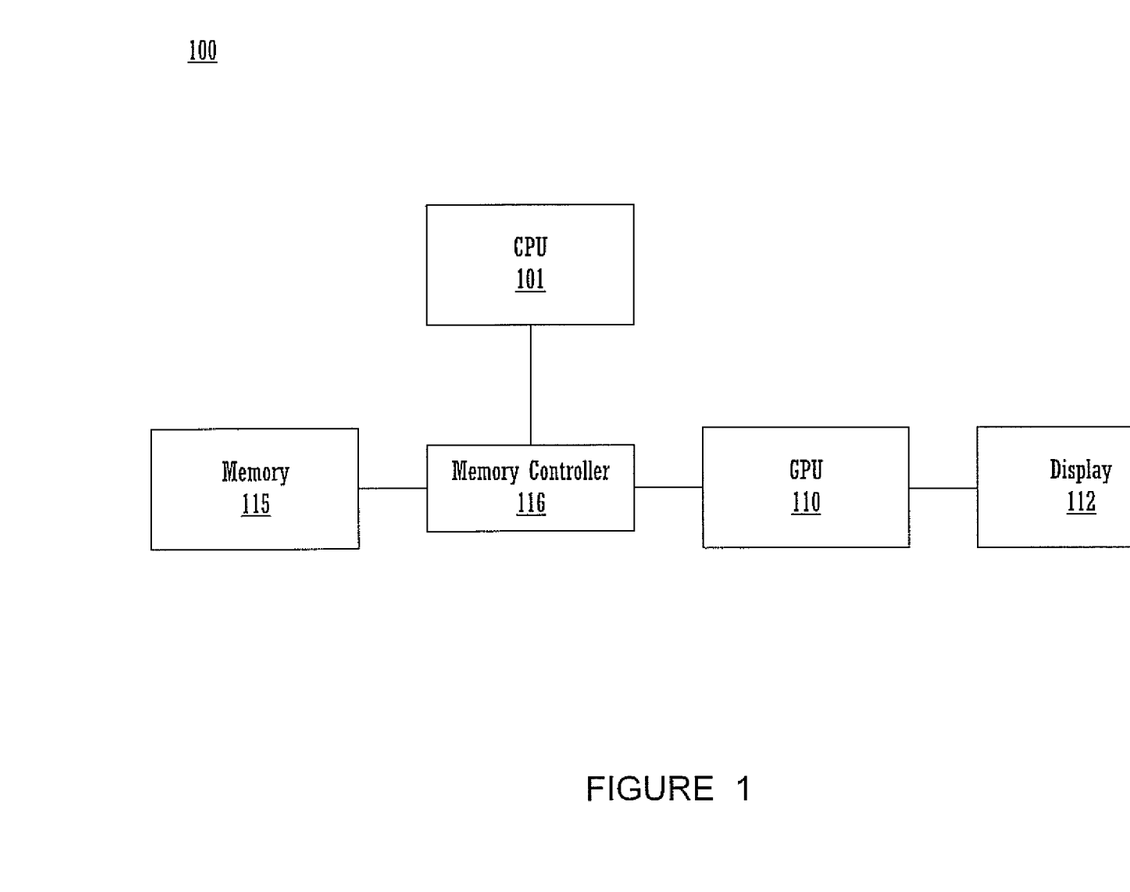
FIG. 1 shows a computer system in accordance with one embodiment of the present invention.

Computer System Platform:

FIG. 1 shows a computer system 100 in accordance with one embodiment of the present invention. Computer system 100 depicts the components of a basic computer system in accordance with one embodiment of the present invention that provides the execution platform for implementing certain hardware-based and software-based functionality of the present invention. As described above, certain processes and steps of the present invention are realized, in one embodiment, as a series of instructions (e.g., software program) that reside within computer readable memory units of a computer system (e.g., system 100) and are executed by the CPU of system 100. When executed, the instructions cause the computer system 100 to implement the functionality of the present invention as described below.

In general, computer system 100 comprises at least one CPU 101 coupled to a system memory 115 and a graphics processor unit (GPU) 110 via one or more busses as shown. Access to the system memory 115 is implemented by a memory controller 116. The GPU 110 is coupled to a display 112. System 100 can be implemented as, for example, a desktop computer system or server computer system, having a powerful general-purpose CPU 101 coupled to a dedicated graphics rendering GPU 110. In such an embodiment, components would be included that are designed to add peripheral buses, specialized graphics memory and system memory, 10 devices, and the like.

It should be appreciated that although the GPU 110 is depicted in FIG. 1 as a discrete component, the GPU 110 can be implemented as a discrete graphics card designed to couple to the computer system via a graphics port (e.g., AGP port, PCI Express port, or the like), as a discrete integrated circuit die (e.g., mounted directly on the motherboard), or as an integrated GPU included within the integrated circuit die of a computer system chipset component (e.g., integrated within a Northbridge chip). Additionally, a local graphics memory can be included for the GPU 110 (e.g., for high bandwidth graphics data storage). It should be noted that although the memory controller 116 is depicted as a discrete component, the memory controller 116 can be implemented as an integrated memory controller within a different component (e.g., within the CPU 101, GPU 110, etc.) of the computer system 100. Similarly, system 100 can be implemented as a set-top video game console device such as, for example, the Xbox®, available from Microsoft Corporation of Redmond, Wash.

Embodiments of the Invention

Figure 2:
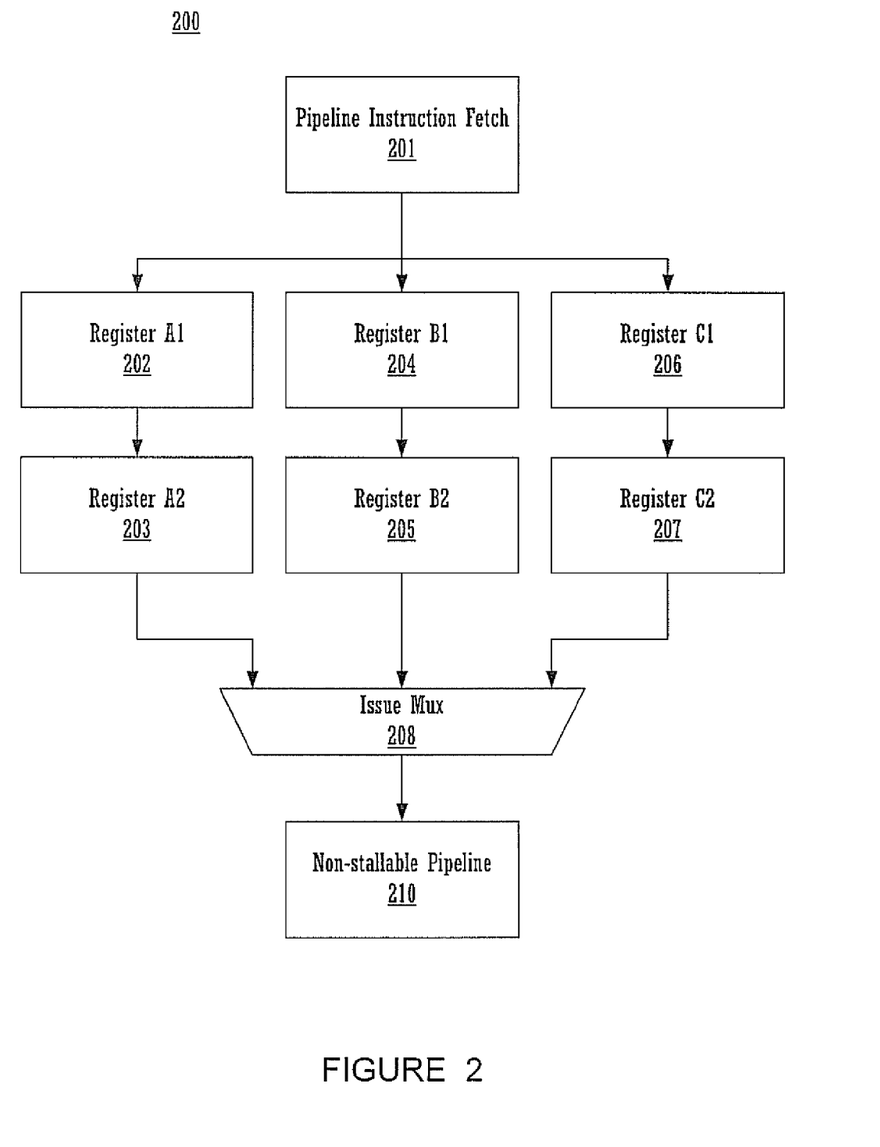
FIG. 2 shows a diagram illustrating an instruction fetching system in accordance with one embodiment of the present invention.

FIG. 2 shows a diagram illustrating an instruction fetching system 200 in accordance with one embodiment of the present invention. As depicted in FIG. 2, the instruction fetching system 200 includes a pipeline instruction fetch interface 201 coupled to a set of instruction registers 202-207, which are in turn coupled to a non-stallable pipeline 210 via an instruction issue multiplexer 208.

In the system 200 embodiment of FIG. 2, a graphics instruction fetching method is implemented between the components of the GPU 110 of the computer system 100. The GPU 110 supports the execution of a plurality of threads in a multithreaded execution environment. In the present embodiment, instruction registers 202-207 are configured to support interlaced runtime execution of three threads. Each thread is supported by a pair of the instruction registers as shown. For example, one thread (e.g., thread A) is supported by the registers 202 and 203, another thread (e.g., thread B) is supported by the registers 204 and 205, and so on.

In this manner, a respective plurality of instructions are fetched by the instruction fetch interface 201 and stored into the registers 202-207 to support the execution of the threads A, B, and C. In the present embodiment, the instructions for the threads are issued into the non-stallable pipeline 210 via the issue multiplexer 208.

In the present embodiment, the hardware of the non-stallable pipeline 210 is optimized for maximum throughput and overall rendering speed. The architecture of the pipeline 210 is such that the execution hardware is non-stallable, in that, for example, intermediate results within the pipeline 210 advance step-by-step through the pipeline 210 with successive clock cycles. The pipeline 210 cannot be stalled by means of wait states or the like. In the present embodiment, the "front end" of the pipeline, or the instruction fetch interface 201 and the instruction registers 202-207, are configured to support the instruction demands of the non-stallable pipeline 210.

Figure 3:
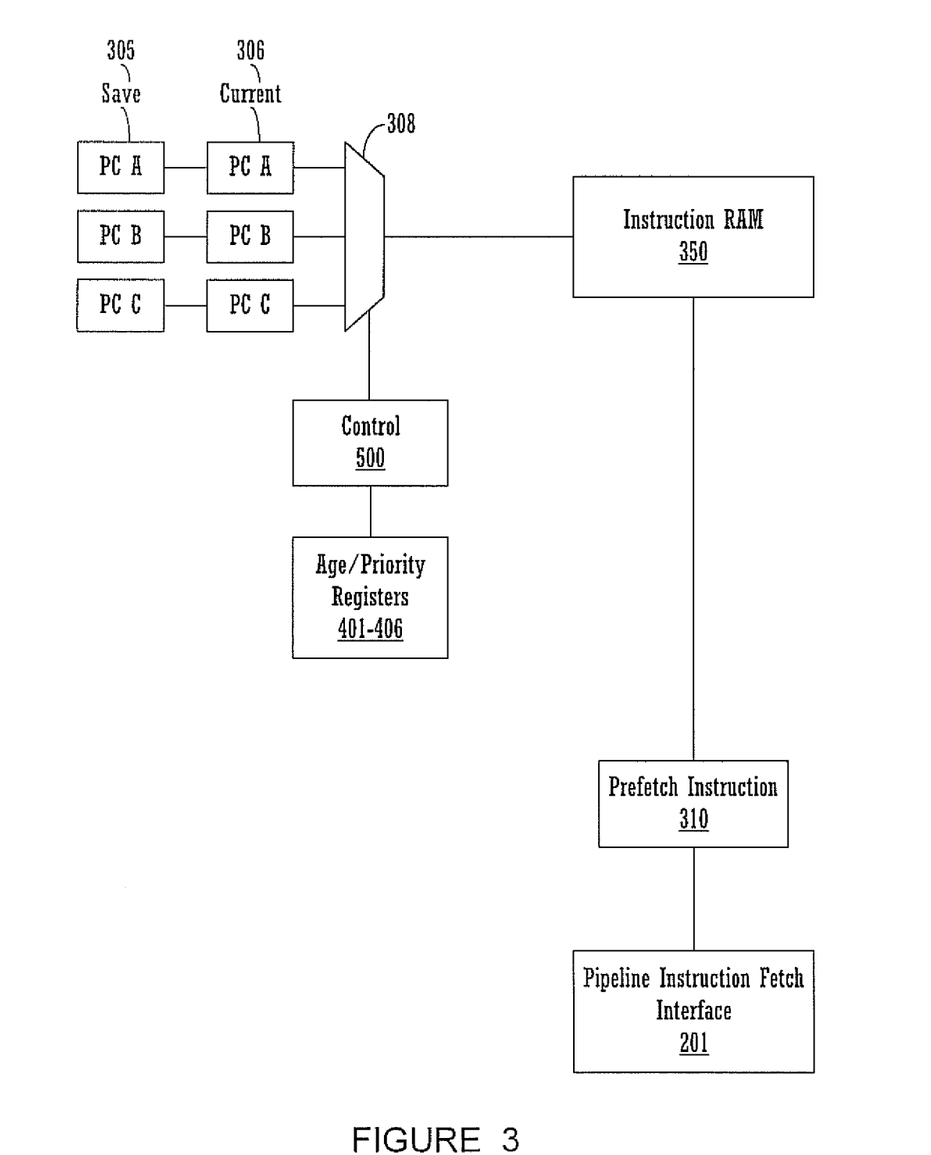
FIG. 3 shows a diagram depicting a prefetching system in accordance with one embodiment of the present invention.

FIG. 3 shows a diagram depicting a prefetching system 300 in accordance with one embodiment of the present invention. As depicted in FIG. 3, a first set 305 of program counter registers (e.g., PC A, PC B, and PC C) and a second set 306 of program counter registers are shown connected to a multiplexer 308. The multiplexer 308 is controlled by a state machine (e.g., process 500 of FIG. 5). The program counters are coupled to an instruction RAM 350 via the multiplexer 308. Prefetched instructions are transferred from the instruction RAM 3082 a buffer 310 prior to transfer to the pipeline instruction fetch interface 201.

Referring to the system 300 embodiment, the objective of the speculative prefetch is that if it is known that a given thread has no valid instructions, or has less than other threads, or will be invalidating all of its cached instructions because of a branch, system 300 will fetch for that thread. However, if all thread caches are full, system 300 can speculatively fetch for one of the threads what instruction it thinks will be next, and try to guess which thread will issue next (and thus have room for another instruction).

Thus, one of the current program counters 306 is used to pull an instruction from the instruction RAM 350, for example, for thread A. When this instruction 310 comes out of the instruction RAM 350 (e.g., 2 cycles later), system 300 checks to see if thread A can accept the instruction. If not, the instruction 310 is discarded, and the PC reset for thread A such that system 300 will reattempt. As shown in FIG. 3, the program counter is reset by transferring the value from the saved program counter register 305 to the current program register 306.

In this manner, since the instruction prefetch is pipelined from selecting one of the PCs (threads) on one clock, getting the result of the instruction RAM 350 on another clock, and having the instruction 310 clocked into the pipeline interface 201 on the next, system 300 will have prefetches for multiple threads in flight at any given moment. Thus, in the prior example of prefetching thread A's next instruction, system 300 would have then prefetched thread B on the next clock and thread C on the following, and if thread A is thrown away, system 300 would have gone back and tried again on the cycle after prefetching thread C's instruction.

Control of the multiplexer is implemented through a process state machine 500 (e.g., the steps shown in FIG. 5 below). Variables regarding the program counters for the three threads are maintained by age/priority registers 401-406 (e.g., shown in FIG. 4 below).

It should be noted that the prefetched instructions are speculative. For example, the instruction(s) is accessed from the prefetch buffer 310 if required by the thread (e.g., thread A). If the instruction is not required (e.g., as in a case where thread A branches), the instruction is discarded. In this manner, instructions can be speculatively prefetched and stored within the prefetch buffer 310, where they are subsequently accessed if required.

Figure 4:
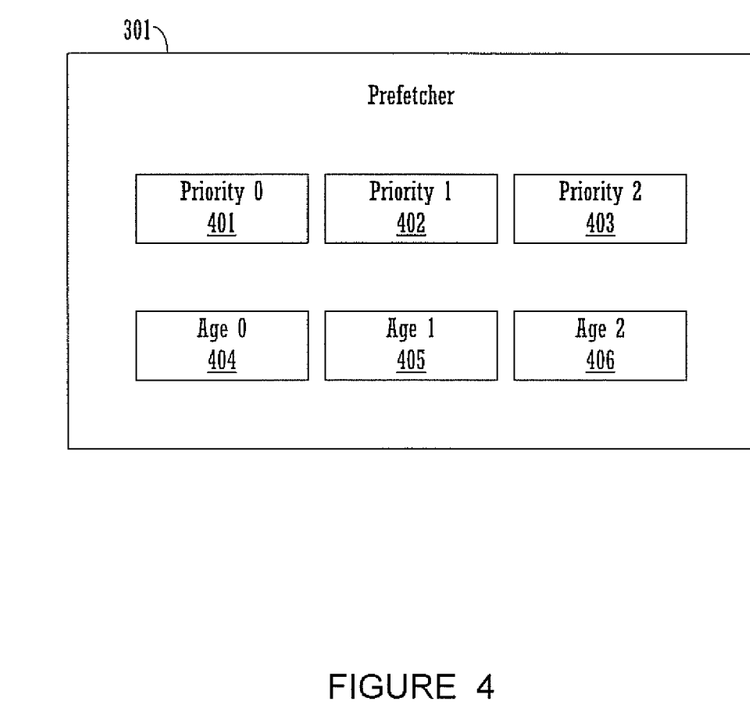
FIG. 4 shows a diagram depicting the prefetch control registers in accordance with one embodiment of the present invention.

FIG. 4 shows a diagram depicting the prefetch control registers 301 in accordance with one embodiment of the present invention. As depicted in FIG. 4, the prefetch control registers 301 includes a set of priority registers 401-403 and a set of age registers 404-406.

In one embodiment, a respective priority is assigned to each of the threads A, B, and C and tracked by the registers 401-403. New instructions are prefetched for each of the threads in accordance with the respective priority. Additionally, in one embodiment, a respective age is assigned to each of the threads A, B, and C and tracked by the registers 404-406. New instructions are prefetched for each of the threads A, B, and C also in accordance with the respective age.

Thus, in the present embodiment, the prefetch control registers 301 manages a priority per thread, where each thread can be a priority 0, 1, or 2. For example, priority 0 is generated whenever the count of instructions in the issue unit (e.g., the registers 202-207) is zero, or when a branch is taken (and the count will be knocked to zero on the next clock). Instructions are fetched for priority 0 threads first. If there is more than one priority 0 thread, the oldest priority 0 thread is given preference.

The age maintained by the three age registers 404-406 keeps track of the thread it is associated with, as described above. For example, age 0 holds the thread ID of the youngest thread, and age2 holds the thread ID of the oldest. Typically, one thread ID resides in each age register, and no thread ID resides in more than one.

In this manner, an ordered list of tiebreakers is maintained for the threads A, B, and C. In one embodiment, when a thread is selected, all younger age registers are shifted up, and age 0 is assigned the read thread ID. For example, in the nominal case where the age2 thread is used, this amounts to a simple barrel-shift of the registers age0→age1→age2→age0. However, if the age 1 thread were selected (e.g., because of priority), the age 2 thread remains the same, and age0→age1→age0.

In the present embodiment, there are three priority masks (e.g., pri0, pri1 and pri2) maintained by the registers 401-403. Generally, priority 0 is for when the issue unit (e.g., the registers 202-207) is empty, priority 2 is for when there is no room for any other instructions in the issue unit (and any fetch would be speculative), and priority 1 is the nominal case.

Once all active threads are in the priority 2 state, speculative fetches begin on the oldest thread. If there is an open spot in the issue stage by the time the instruction is fetched out of the instruction RAM 350 (e.g., typically two cycles later), the instruction flows from the prefetch buffer 310 to the issue stage. If not, the instruction is discarded, and the program counter is reset to try again. It should be noted that the number of speculative fetches per thread is dependent upon the specifics of an individual design. For example, one design might allow one speculative fetch per thread while another design might allow two or more speculative fetches per thread. The depth and latency of a given pipeline design is one factor in determining the optimal number of speculative fetches per thread that should be implemented.

Figure 5:
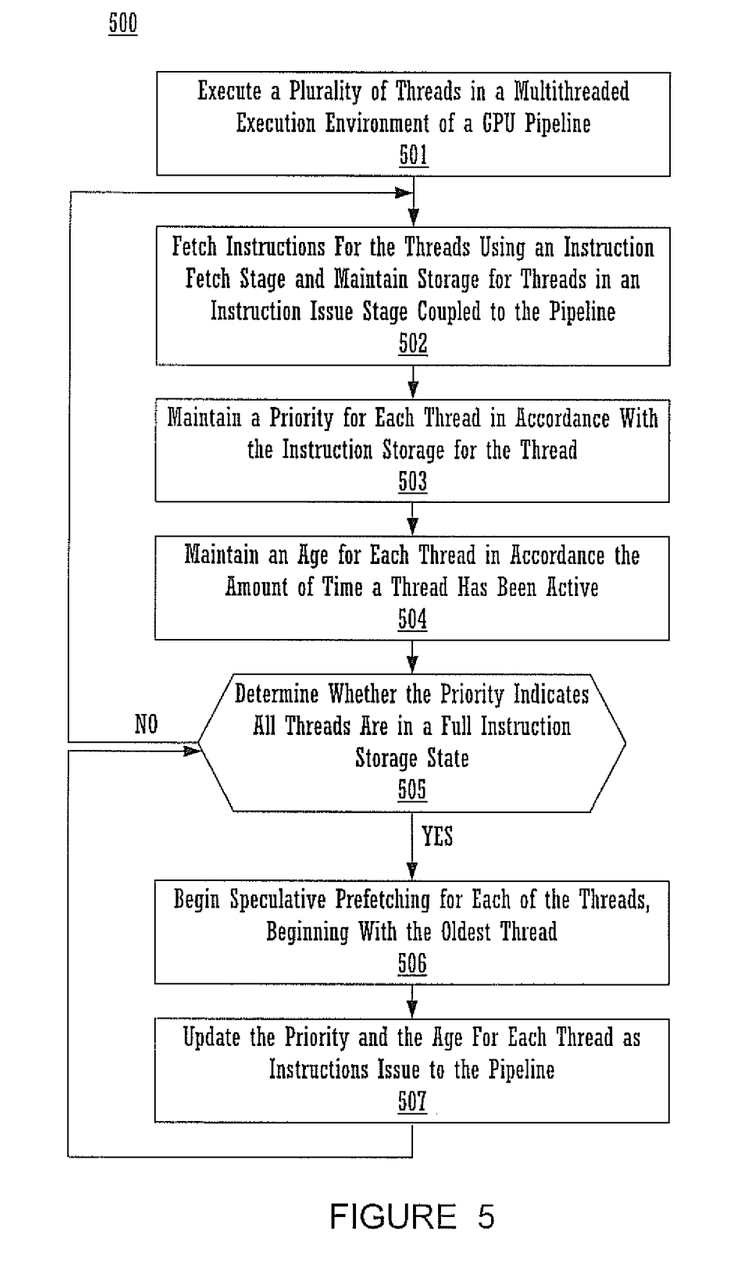
FIG. 5 shows a flowchart of the steps of an instruction fetching process in accordance with one embodiment of the present invention.

FIG. 5 shows a flowchart of the steps of a process 500 in accordance with one embodiment of the present invention. As depicted in FIG. 5, process 500 shows the operating steps of an instruction fetching method (e.g., state machine) as implemented on one or more non-stallable pipelines of a GPU (e.g., GPU 110 of FIG. 1).

Process 500 begins in step 501, where a plurality of threads execute in a multithreaded execution environment of the GPU pipeline (e.g., pipeline 210 of FIG. 2). In step 502, instructions are fetched for the threads using an instruction fetch stage (e.g., instruction fetch interface 201) and maintain storage for threads in an instruction issue stage coupled to the pipeline. As described above, instructions are fetched for the threads and subsequently issue to the non-stallable pipeline through an issue stage (e.g., registers 202-207). In step 503, a priority is maintained for each thread in accordance with the instruction storage for the thread. In step 504, an age is maintained for each thread in accordance the amount of time a thread has been active. As described above, the priority and the age of each of the threads is maintained in a set of registers (e.g., registers 401-406 of FIG. 4).

In step 505, the process 500 determines whether the priority indicates all threads in the issue stage are in a full instruction storage state. As described above, in one embodiment, three priority masks (e.g., pri0, pri1 and pri2) maintained by the registers 401-403 track the instruction storage state. If the issue stage is not full, process 500 proceeds back to step 502, where more instructions are fetched to fill the issue stage. If the issue stage is full, process 500 proceeds to step 506. In step 506, speculative prefetching begins for each of the threads, starting with the oldest thread first. As described above, the age of each active thread is maintained by the age registers 404-406. And in step 507, the priority and the age for each thread is updated as instructions issue to the pipeline 210. After step 507, process 500 returns to step 505 to determine if any thread needs priority 0 or 1 servicing, otherwise process 500 can return to speculative prefetch.

In this manner, the overall effect of the prefetch system of the present invention is that the prefetch system is able to store information from the issue stage, thereby avoiding timing paths, and still keep the non-stallable pipeline full in an array of different instruction execution cases.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for graphics instruction fetching for shader program execution, comprising:
   executing a plurality of threads in a multithreaded execution environment;
   fetching a respective plurality of instructions for the threads;
   during runtime, prefetching at least one instruction for one of the threads to a prefetch buffer;
   accessing the at least one instruction from the prefetch buffer if required by the one thread;
   discarding the at least one instruction if not required by the one thread;
   assigning a respective priority to each of the threads;
   assigning a respective age to each of the threads;
   prefetching new instructions for each of the threads in accordance with the respective priority and with the respective age wherein priority and age are used together to select a thread for prefetching and wherein the age of the selected thread is used to determine a subsequent age assignment for each of the threads;
   executing the plurality of threads using a non-stalling graphics rendering pipeline; and
   executing the plurality of threads using a non-stalling vertex pipeline of a GPU (graphics processor unit), wherein the plurality of instructions are vertex instructions.

2. The method of claim 1, further comprising:
   executing the plurality of threads using a non-stalling vertex pipeline of a GPU (graphics processor unit), wherein the plurality of instructions are shader vertex instructions.

3. The method of claim 1, further comprising:
   prefetching a respective at least one instruction for each thread executing in the multithreaded execution environment using a respective program counter.

4. The method of claim 3, wherein each respective program counter accesses a plurality of prefetched instructions for the respective threads.

5. The method of claim 1, further comprising:
   assigning a respective register to track a respective age of each of the threads; and
   prefetching new instructions for each of the threads in accordance with the respective age.

6. The method of claim 1, further comprising:
   maintaining priority for each of the threads in accordance with instructions storage for each of the threads.

7. A graphics rendering pipeline, comprising:
   a non-stalling instruction execution pipeline for executing a plurality of threads in a multithreaded execution environment;
   an instruction fetch unit for fetching a respective plurality of instructions for the threads;
   a prefetch buffer coupled to the instruction fetch unit and for storing at least one instruction for one of the threads during runtime, wherein the at least one instruction is accessed from the prefetch buffer if required by the one thread, and wherein the at least one instruction is discarded if not required by the one thread; and
   a process state machine for:
   assigning a respective priority to each of the threads;
   assigning a respective age to each of the threads;
   prefetching new instructions for each of the threads in accordance with the respective priority and with the respective age wherein priority and age are used together to select a thread for prefetching and wherein the age of the selected thread is used to determine a subsequent age assignment for each of the threads; and
   executing the plurality of threads using the non-stalling instruction execution pipeline.

8. The graphics rendering pipeline of claim 7, wherein the instruction fetch unit implements speculative prefetching.

9. The graphics rendering pipeline of claim 7, wherein an instruction fetcher process state machine assigns a respective priority to each of the threads, and wherein new instructions are prefetched for each of the threads in accordance with the respective priority.

10. A non-transitory computer readable media having computer readable code which when executed by a processor of a computer system cause the computer system to implement a method for graphics instruction fetching, comprising:
    executing a plurality of threads in a multithreaded execution environment;
    fetching a respective plurality of instructions for the threads;
    during runtime, prefetching at least one instruction for one of the threads to a prefetch buffer;
    accessing the at least one instruction from the prefetch buffer if required by the one thread;
    discarding the at least one instruction if not required by the one thread;
    assigning a respective priority to each of the threads;
    assigning a respective age to each of the threads;
    prefetching new instructions for each of the threads in accordance with the respective priority and the respective age wherein priority and age are used together to select a thread for prefetching and wherein the age of the selected thread is used to determine a subsequent age assignment for each of the threads; and
    executing the plurality of threads using a non-stalling graphics rendering pipeline.

11. The non-transitory computer readable media of claim 10, further comprising:
executing the plurality of threads using a non-stalling vertex pipeline of a GPU (graphics processor unit), wherein the plurality of instructions are vertex instructions.

12. The non-transitory computer readable media of claim 10, further comprising:
prefetching a respective at least one instruction for each thread executing in the multithreaded execution environment to a respective program counter.

13. The non-transitory computer readable media of claim 12, wherein each respective program counter accesses a plurality of prefetched instructions for the respective threads.

14. The non-transitory computer readable media of claim 10, further comprising:
assigning a respective age to each of the threads by a process state machine; and
prefetching new instructions for each of the threads in accordance with the respective age.

* * * * *